Figure 2:
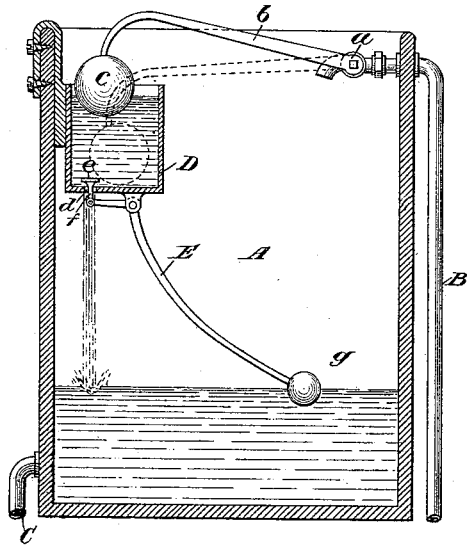

(No Model.)

C. C. WORTHINGTON.
WATER TANK.

No. 373,546. Patented Nov. 22, 1887.

Attest:
Geo. H. Botts.
J. A. Hovey

Inventor:
Charles C. Worthington
by
Munson & Philipp
Attys.

UNITED STATES PATENT OFFICE.

CHARLES C. WORTHINGTON, OF IRVINGTON, NEW YORK.

WATER-TANK.

SPECIFICATION forming part of Letters Patent No. 373,546, dated November 22, 1887.

Application filed November 26, 1884. Serial No. 148,871. (No model.)

*To all whom it may concern:*

Be it known that I, CHARLES C. WORTHINGTON, a citizen of the United States, residing at Irvington, county of Westchester, and State of New York, have invented certain new and useful Improvements in Water-Tanks, fully described and represented in the following specification and the accompanying drawings, forming a part of the same.

This invention relates to that class of tanks or cisterns which are located in the upper parts of houses or other buildings to receive and hold a supply of water which can be drawn upon for immediate use. These tanks are filled through a pipe leading from the street-main or other source of supply, and are provided with a pipe or pipes leading to the various parts of the house where the water is to be used. In order to insure the tank being always filled, so as to afford a sufficient supply for immediate use and yet prevent it from overflowing, the pipe through which it is supplied is provided with a cock or valve, which is connected to and operated by a float which rides upon the surface of the water in the tank. The cock, float, and connections are so adjusted that when the water rises to a certain height in the tank the float, riding upward upon its surface, will close the cock or valve of the supply-pipe, so as to shut off the further admission of the water, and that when the water falls below a certain height the float, falling with it, will open the cock or valve and allow the water to again flow until the proper level is restored. When a tank is thus equipped, it has been found in practice that when the water is drawn therefrom slowly or in small quantities, which is usually the case in using water for the purposes for which it is commonly required in houses, the surface of the water in the tank will never, or at least very rarely, be lowered more than enough to partly open the cock or valve of the supply-pipe, so as to allow the water to flow into the tank in a small stream. This is due to the fact that unless the water is being drawn rapidly from the tank the small stream which is admitted as soon as the cock or valve is partly opened will maintain the level of the water and prevent the float from falling farther, so as to complete the opening of the cock or valve. In those places where water-meters are used to determine the amount of water consumed in each house this action of the float and cock has proved a great obstacle to the securing of an accurate registration of the water passing through the meter. This is due to the fact that the meters of neither of the classes in common use are capable of indicating with accuracy the amount of water passing through them unless the water flows with considerable velocity. If the meter is of the rotary type and only a small stream is being drawn, the meter will frequently fail to register at all, thereby working a loss to the water company, while on the other hand, if the meter is of the piston or plunger type, it will register a larger amount when a small stream is being drawn than is really passing through the meter, thereby making the consumer pay for more than he has used. In order to overcome these difficulties, it is highly desirable that some means should be provided by which the cock or valve controlling the supply-pipe of the tank will be kept either wholly closed or wholly opened, thereby causing the water, whenever it flows at all, to flow with a stream equal to the full capacity of the pipe, and thus cause the meter to register accurately.

It is the object of the present invention to provide means by which this result will be attained; and to that end the invention consists, broadly, in a means by which the cock or valve which controls the supply-pipe, when once closed, will be retained in that position, so as to shut off all flow of water into the tank until the latter has been nearly emptied, and will then be quickly opened to its full extent, so as to permit a full flow of water until the tank is again filled, when it will be quickly closed, thereby preventing the water from flowing into the tank in a small and irregular stream, which prevents the accurate operation of the meter.

The details of the apparatus embodying the invention will now be particularly described, reference being had to the accompanying drawings, in which—

Figure 3:
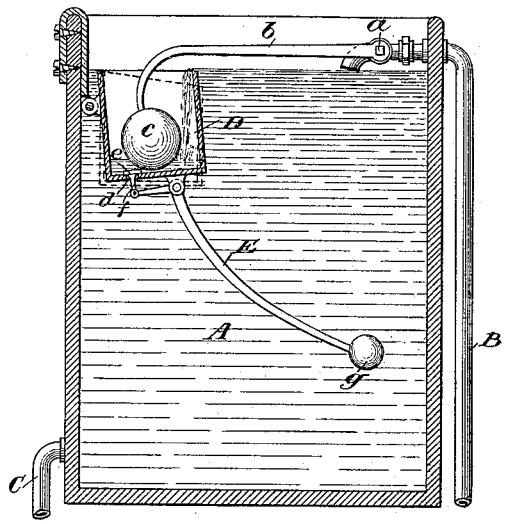
Figure 1:
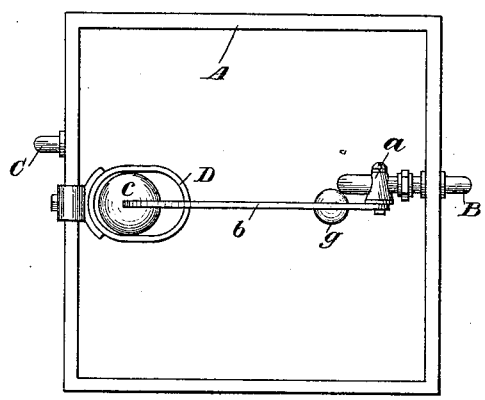
Figure 4:
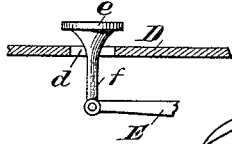

Figure 1 is a plan view of an ordinary water-tank or cistern provided with the present invention. Fig. 2 is a central sectional elevation of the same. Fig. 3 is a similar view, showing also a slight modification, which will be hereinafter referred to; and Fig. 4 is an enlarged sectional detail, which will also be hereinafter referred to.

Referring to said figures, it is to be understood that A represents a water-tank of the common form and construction, B the pipe through which it is supplied, and C the pipe through which the water is discharged. The supply-pipe B is provided with the usual cock or valve, $a$, by which the flow of the water through the pipe is controlled, and the cock is operated by means of a lever, $b$, to the end of which is attached a float, $c$, which rides upon the surface of the water. Directly beneath the float $c$ there is located a small supplemental tank or compartment, D, which is of sufficient diameter to receive the float $c$ and of sufficient depth to permit the float to have the proper rising and falling movement to open and close the cock. The supplemental tank D may be of any desired form in cross-section, and may be supported in any convenient or suitable manner, or be made integral with the main tank. The form and arrangement shown are, however, well adapted for the purposes intended. The tank D is provided at its bottom with an opening, $d$, which is controlled by an ordinary upwardly-opening valve, $e$, the stem $f$ of which is connected to one arm of a lever, E, (see Fig. 4,) which is fulcrumed to the bottom of the tank D, and has its other arm curved downward so as to terminate at a point near the bottom of the main tank A, where it is provided with a float, $g$.

The operation of the apparatus just described is as follows: Assuming both the main and supplemental tanks to be empty, the float $c$ will fall to the bottom of the tank D, as indicated by dotted lines in Fig. 2, so as to fully open the cock $a$ and permit the full flow of water to enter the tank. As the water rises in the main tank and reaches a level slightly above that shown in Fig. 2, the float $g$, riding upward upon the surface of the water, will close the valve $e$, and as the water continues to rise so as to submerge the float its buoyancy will continue to hold the valve closed even after the water has risen above the bottom of the tank D, thereby preventing the water from entering the supplemental tank so as to move the float $c$ and partially close the cock $a$. By this means it will be seen that the water is permitted to flow from the supply-pipe without any decrease of its stream until the level of the water in the main tank has reached the top of the supplemental tank. As soon as the water in the main tank has reached this level it will overflow into the supplemental tank, so that the latter, being of small size, will be very quickly filled, thereby raising the float $c$ very quickly and entirely shutting off the flow of water through the supply-pipe. As the water is drawn from the main tank the small quantity left in the supplemental tank will sustain the float $c$ in its raised position, so as to keep the cock $a$ fully closed until the water in the main tank is lowered to about the point shown in Fig. 2, when the float $g$ will commence to fall, and in so doing will open the valve $e$, so as to quickly empty the tank D and allow the float $c$ to fall back to the position shown by the dotted lines in Fig. 2, and open the cock $a$ to its full extent to refill the tank.

From the foregoing it will be seen that the cock $a$, whenever opened so as to permit any flow of water, is opened to its full extent, thereby allowing the water to flow through the meter with sufficient velocity and volume to secure an accurate registration by the meter.

It will be observed that in the construction shown in Figs. 1 and 2 the supplemental tank D is rigidly secured to the side of the main tank. With this arrangement it might sometimes happen, if one or more of the cocks controlling the discharge-pipe C should be opened at or immediately after the time when the water from the main tank has commenced to overflow into the tank D, that the water in the main tank would be lowered below the top of the tank D before the latter was sufficiently filled to raise the float high enough to entirely close the cock $a$, thereby leaving the cock partly open, so that a small stream would continue to flow from the pipe B. In order to prevent this the tank D may be hinged to the side of the main tank, so as to be capable of a slight tilting motion, as shown in Fig. 3. When the tank D is arranged in this manner, it will be buoyed up by the rising water in the main tank, so as to be held in the position shown in Fig. 3 until the water has risen sufficiently high to overflow into it. The parts will be so adjusted, however, that as soon as a small amount of water has accumulated in the tank D the weight of the water so accumulated will tilt the tank back to the position shown by the dotted lines, thereby allowing the tank to be instantly filled, so as to raise the float $c$ and close the cock $a$.

It is to be remarked that the valve $e$, instead of being located in the bottom of the supplemental tank, may be located in the side of the tank, if preferred, and also that the form of the valve may be different from that shown, without departing from the invention. It is also to be understood that the form of the connections for operating the valve $e$ may be varied considerably from that shown without departing from the invention, so long as the valve is kept closed until the water in the main tank has fallen below the bottom of the supplemental tank, and is then opened, so as to allow the supplemental tank to be quickly emptied.

What I therefore claim is—

1. The combination, with the tank A, its supply-pipe, and the cock or valve for controlling the same, of the float C, for operating said cock or valve, the submerged float $g$, and the tank D, valve $e$, and lever E, or equivalent connections, by which the float $g$ controls the falling movement of the float C, substantially as described.

2. The combination, with the tank A and the cock or valve for controlling its supply-pipe, of the float for operating said cock or valve, the supplemental tank D, provided with the valve e, and the float for controlling said valve, substantially as described.

3. The combination, with the tank A and the cock or valve for controlling its supply-pipe, of the float for operating said cock or valve, the tilting supplemental tank D, provided with the valve e, and the float for controlling said valve, substantially as described.

In testimony whereof I have hereunto set my hand in the presence of two subscribing witnesses.

CHAS. C. WORTHINGTON.

Witnesses:
D. H. JOHNSON,
T. H. PALMER.